United States Patent [19]

Morino

[11] 4,205,729
[45] Jun. 3, 1980

[54] AUTOMOTIVE POWER UNIT

[75] Inventor: Hideki Morino, Nagoya, Japan

[73] Assignee: Toyota Jidosha Kogyo Kabushiki Kaisha, Toyota, Japan

[21] Appl. No.: 927,819

[22] Filed: Jul. 25, 1978

[30] Foreign Application Priority Data

Jul. 27, 1977 [JP] Japan .................................. 52-89312

[51] Int. Cl.² ........................................... B60K 17/08
[52] U.S. Cl. ....................................... 180/55; 180/292
[58] Field of Search ................... 180/55, 54 F, 56, 57, 180/54 R, 64 R

[56] References Cited

U.S. PATENT DOCUMENTS

| | | | |
|---|---|---|---|
| 2,536,560 | 1/1951 | Limon | 180/64 R |
| 2,714,936 | 8/1955 | Gregory | 180/54 F |
| 2,784,794 | 3/1957 | Barenyi | 180/57 |
| 3,474,876 | 10/1969 | Magnier | 180/54 F |

FOREIGN PATENT DOCUMENTS

| | | |
|---|---|---|
| 976014 | 11/1964 | United Kingdom . |
| 987189 | 3/1965 | United Kingdom . |
| 1011956 | 12/1965 | United Kingdom . |
| 1023229 | 3/1966 | United Kingdom . |
| 1317370 | 5/1973 | United Kingdom . |

*Primary Examiner*—Robert R. Song
*Attorney, Agent, or Firm*—Cushman, Darby & Cushman

[57] ABSTRACT

A power unit for a front drive or a four-wheel drive automotive vehicle comprises a counterflow, intake-exhaust type engine with straight-lined cylinders, a clutch, a transmission assembly, a final gear kit and a differential gear unit compactly arranged to one another. The engine is mounted approximately at the center of the width of the vehicle with a crank shaft of the engine extending in a longitudinal direction of the vehicle, and the final gear kit and the differential gear unit are disposed below the engine. The transmission assembly has an output shaft connected coaxially to a final drive pinion shaft which is disposed at the center of the width of the vehicle and extends below the clutch. The engine is slanted with respect to a vertical plane toward one lateral side of the vehicle so as to make the connecting rod locus remote from a final ring gear of the final gear kit to the largest possible extent, and an intake and exhaust manifolds are disposed on one lateral side of the engine near to the final ring gear. The power unit of this structure contributes to a compact design of the engine compartment.

7 Claims, 15 Drawing Figures

AUTOMOTIVE POWER UNIT

The present invention relates to an automotive vehicle which includes a counterflow, intake-exhaust type engine with straight-lined cylinders disposed on the vehicle with a crank shaft of the engine extending in a longitudinal direction of the vehicle, and more particularly to a power unit for use with a front drive or a four-wheel drive automotive vehicle which includes the abovementioned engine, a clutch, a transmission assembly, a final gear kit and a differential gear unit compactly arranged with one another.

In some countries an automotive vehicle has a steering system disposed on the right-hand side of the vehicle, while in other countries it has a steering system disposed on the left-hand side. The both types of automotive vehicles are referred in this specification to rightside steering vehicle and leftside steering vehicle, respectively. Ordinarily, a brake pedal is located between the feet of a driver, and a brake master cylinder with a booster which is operatively coupled to the brake pedal is mounted in an engine compartment forwardly of the brake pedal. Thus, the brake master cylinder in the rightside steering vehicle is located at the right rear in the engine compartment, while the brake master cylinder in the leftside steering vehicle is located at the left rear therein.

In the case where the engine is disposed on the vehicle with the crank shaft of the engine extending in the longitudinal direction of the vehicle, such engine is ordinarily disposed substantially at the center of the vehicle as viewed in the transverse direction of the latter, and the master cylinders of the rightside and leftside steering vehicles are disposed on the right and left sides, respectively, of the engine. The engine compartment is designed to take on the right and left sides of the engine spaces for disposing the master cylinders of both rightside and leftside steering systems, so as to enable that optionally selected one of the rightside and leftside steering systems may be mounted on the same vehicle.

Upon design of the compact automotive vehicles, consideration is given to reduce to the largest possible extent the overall width and length of the engine compartment. In order to reduce the overall length of the engine compartment, the power unit including the engine and the transmission assembly should be mounted in the backward position of the engine compartment. If the power unit is mounted in this backward position, the brake master cylinder and the engine are juxtaposed with each other in the transverse direction of the vehicle. Consequently, in order to reduce the overall width of the engine compartment, the distance between the places for disposing the brake master cylinders of the rightside and leftside steering systems should be reduced as much as possible.

There has been known a front engine, front drive automotive vehicle of the type which includes a final gear kit and a differential gear unit located below the engine. However, this type of the automotive vehicle has a common defect that the engine compartment cannot be made compact; that is, the overall height, width and length of the engine compartment cannot be sufficiently reduced.

It is an object of the present invention to provide a power unit for use with a front drive or a four-wheel drive automotive vehicle which includes an engine, a clutch, a transmission assembly, a final gear kit and a differential gear unit compactly arranged to one another.

It is another object of the invention to provide an automotive power unit which contributes to a compact design of an engine compartment as well as to an enlargement of an available cabin utility space in the driver's and passenger's compartment of an automotive vehicle.

In accordance with the invention, there is provided a power unit for use with an automotive vehicle comprising a counterflow, intake-exhaust type engine with straight-lined cylinders, the engine being adapted to be mounted on a front side of the vehicle with a crank shaft of the engine extending in a longitudinal direction of the vehicle, clutch means having an output shaft substantially coaxial with the crank shaft of the engine and carrying thereon a driving gear, a transmission assembly having an output shaft extending below and substantially parallel to the output shaft of the clutch means, the output shaft of the transmission assembly being connected to a drive pinion shaft which is disposed substantially at the center of the width of the vehicle, a final gear kit disposed below the engine and including a final drive pinion connected to the drive pinion shaft and a final ring gear, and a differential gear unit disposed below the engine, the engine being slanted with respect to a vertical plane toward one lateral side of the vehicle so as to make the connecting rod locus remote from the final ring gear, the intake and exhaust manifolds being disposed on one lateral side of the engine near to the final ring gear.

The above and other objects, features and advantages of the invention will become more apparent from the following description of the preferred embodiments thereof taken in conjunction with the accompanying drawings.

Same or similar reference numerals are used to designate same or similar parts throughout the Figures.

Prior to the description of the preferred embodiments of the present invention, exemplary prior art automotive power units will be described with reference to FIGS. 1 through 6 in order to more distinctly and specifically point out their drawbacks which the present invention contemplates to overcome.

Figure 1:
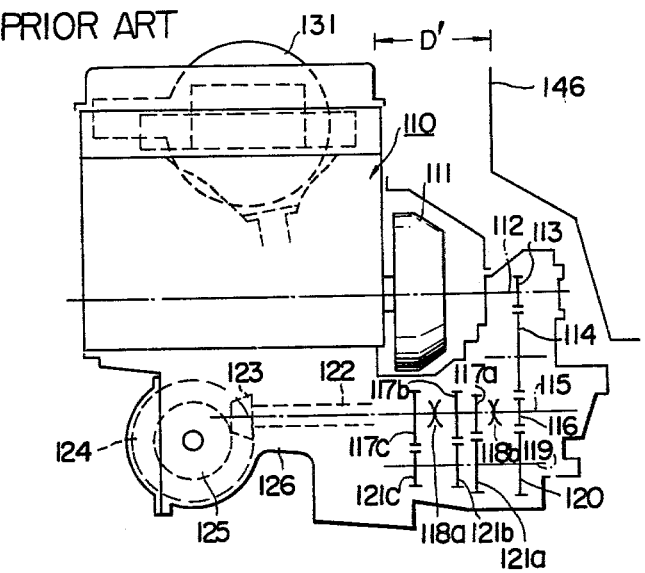
FIG. 1 is a schematic view illustrating a prior art automotive power unit together with a dash panel.
Figure 2:
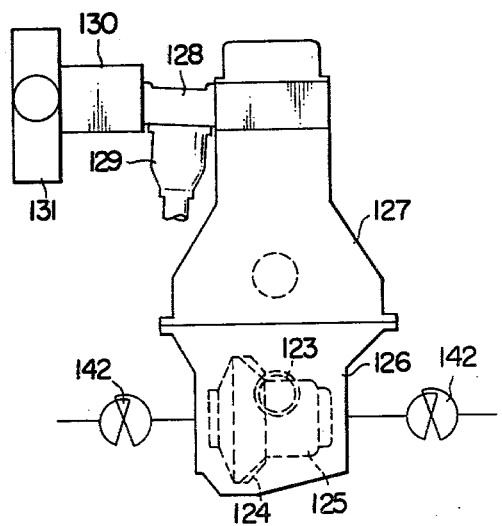
FIG. 2 is a front view of FIG. 1.

First referring to FIGS. 1 and 2, one exemplary structure of the prior art power unit is illustrated. A clutch 111 which is mounted on the rear side of an engine 110 has an output shaft or a clutch shaft 112 fixedly carrying thereon a driving gear 113 in mesh through an idler gear 114 with a transmission input gear 116 rotatably carried by a transmission output shaft 115. The output shaft 115 extends below and in parallel with the clutch shaft 112. Transmission driven gears 117a, 117b and 117c are rotatably carried on the output shaft 115, and synchronizing clutches 118a and 118b are splined to the shaft 115. The driven gears 117a, 117b and 117c and the synchronizing clutches 118a and 118b are spaced apart from the input gear 116 forwardly or leftwards as viewed in FIG. 1 toward the engine 110.

The input gear 116 is in mesh with a countershaft drive gear 120 formed integral with a countershaft 119 which extends in parallel with and below the output shaft 115 so that the power may be transmitted from the input gear 116 to the countershaft 119. Countershaft gears 121a, 121b and 121c which are formed integral with the countershaft 119 and are in constant mesh with the driven gears 117a, 117b and 117c, respectively. The synchronizing clutches 118a and 118b are operated to control the coupling between the output shaft 115 and the gears 116, 117a, 117b and 117c in a well-known manner.

The output shaft 115 is coaxially connected to a drive pinion shaft 122 which is located below the engine 110. On the pinion shaft 122 is carried a final drive pinion 123 which is in mesh with a final ring gear 124. The final drive pinion 123 and the final ring gear 124 constitute a final gear kit. As is well-known, the ring gear 124 rotates a differential gear unit 125 including a differential gear case to which is bolted the ring gear 124, a differential pinion, and a pair of side gears which are in mesh with the differential pinion and are splined to axles connected through universal joints 142 to front wheels (not shown).

The power train for transmitting the power from the clutch shaft 112 to the differential gear unit 125 is enclosed within a unitary case 126 which is directly bolted to the bottom of a cylinder block 127 of the engine 110 and which also serves as an oil pan. The engine 110 further includes an intake manifold 128, an exhaust manifold 129, a carburetor 130 and an air cleaner 131. The power unit is separated from a driver's and passenger's compartment by a dash panel 146.

In case of the compact automotive vehicle, in order to enlarge the driver's and passenger's compartment or the interior dimension of the vehicle body as much as possible, it is imperative to reduce the overall length and overall width of the engine compartment as practically as possible. In order to reduce the overall length of the engine compartment, the power unit is mounted at a rear-most position in the engine compartment so that a brake master cylinder becomes in side-by-side relation with the engine in the transverse direction of the vehicle. Further, in order to reduce the overall width of the engine compartment, a suitable arrangement of the engine with respect to the brake master cylinder should be selected.

Figure 5:
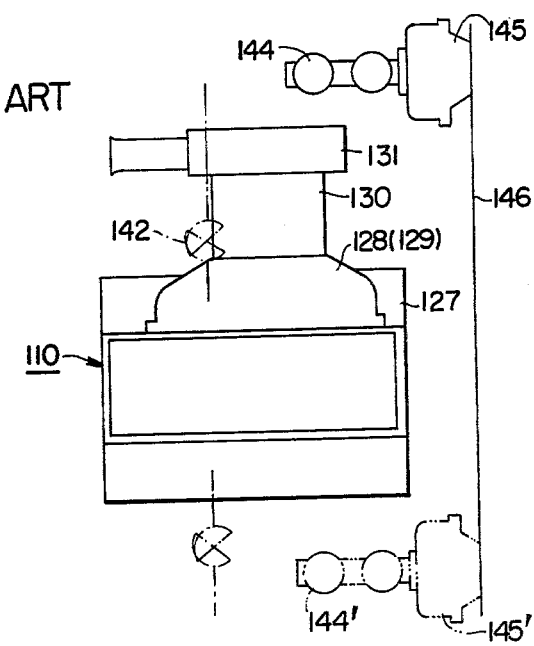
FIG. 5 shows in top view the automotive power unit of FIGS. 1 and 2 together with brake master cylinders of rightside and leftside steering systems.

FIG. 5 shows in top view the power unit illustrated in FIGS. 1 and 2, and the relative arrangement between the power unit and a brake master cylinder 144 with a booster 145 of a rightside steering system together with the position of a brake master cylinder 144' having a booster 145' of a leftside steering system. As best shown in FIG. 5, the overall width of the engine and thus the distance between the brake master cylinders 144 and 144' are increased since the intake manifold 128 and exhaust manifold 129, the carburetor 130 and the air cleaner 131 are successively transversely arranged. This means that the width of the engine compartment and hence the width of the vehicle is increased. It is to be noted here that, as previously described, the engine compartment is designed to take the spaces for disposing the master brake cylinders of both rightside and leftside steering systems.

The power unit shown in FIGS. 1, 2 and 5 has another defect that the overall height of the engine compartment becomes large since the transmission is located below the clutch 111 having a relatively large diameter. Further, since the driving gear 113 carried on the clutch shaft 112 and hence the input gear 116 carried on the transmission output shaft 115 are located remote from the rear end face of the clutch 111, and the transmission driven gears 117a, 117b and 117c are located forwardly (or leftwards as viewed in FIG. 1) from the input gear 116, the distance D' (FIG. 1) between the rear end of the engine and the dash panel 146 and hence the overall length of the engine compartment are increased.

Figure 3:
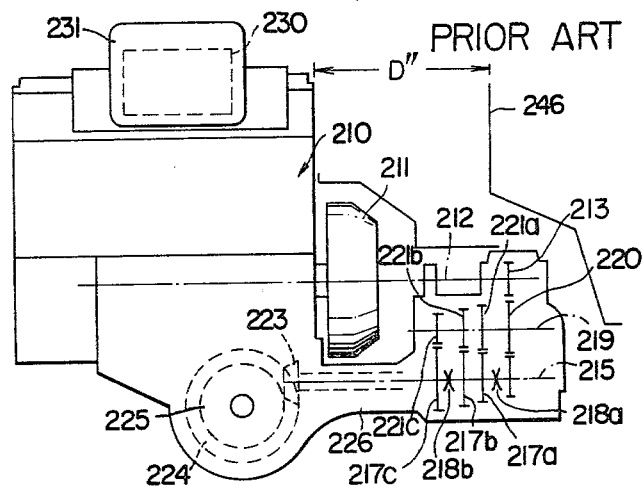
FIG. 3 is a similar view to FIG. 1 illustrating another prior art automotive power unit.
Figure 4:
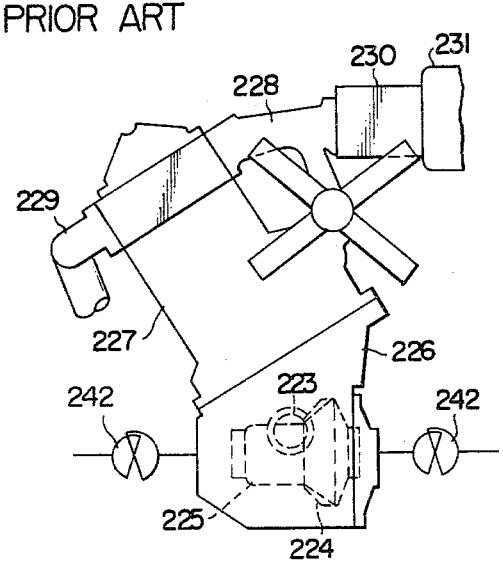
FIG. 4 is a front view of FIG. 3.
Figure 6:
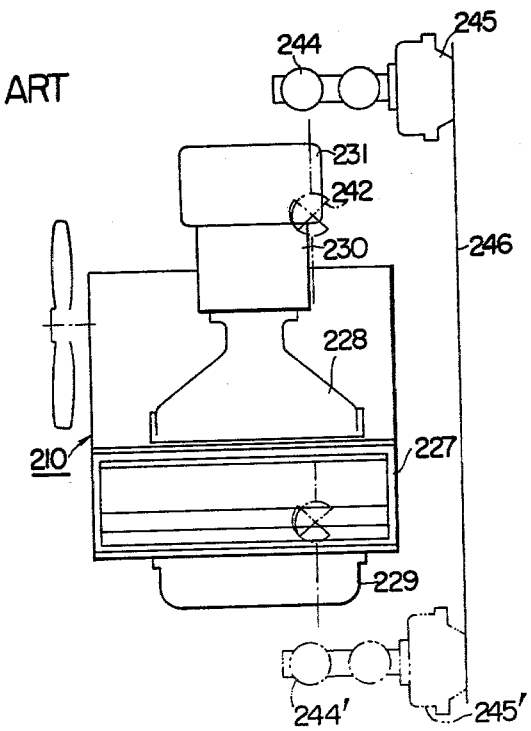
FIG. 6 is a similar view to FIG. 5 showing in top view the power unit of FIGS. 3 and 4.

FIGS. 3, 4 and 6 show another prior art automative power unit which is substantially similar in construction to the power unit described above with reference to FIGS. 1, 2 and 5 except that a countershaft 219 is disposed between an output shaft 215 and a clutch output shaft 212. Countershaft gears 221a, 221b and 221c formed integral with the countershaft 219, driven gears 217a, 217b and 217c rotatably carried on the output shaft 215 and synchronizing clutches 218a and 218b splined to the output shaft 215 are all disposed below and backwardly of a clutch 211. The power is transmitted from the clutch shaft 212 through a driving gear 213 and a countershaft drive gear 220 to the countershaft 219. The synchronizing clutches 218a and 218b are operated to control the coupling between the output shaft 215 and the driven gears carried thereon. The power train for transmitting the power from the clutch output shaft 212 to a differential gear unit 225 is enclosed within a unitary case 226 which is directly bolted to the bottom of a cylinder block 227 of an engine 210 and which also serves as an engine oil pan.

The engine 210 is slanted with respect to a vertical plane toward the left as viewed in FIG. 4. An exhaust manifold 229 is mounted on the inclined left side end of the cylinder block 227, while on the inclined right side end thereof is mounted an intake manifold 228, a carburetor 230 and an air cleaner 231. In FIGS. 3, 4 and 6, numerals 223, 224, 246 and 242 designate a final drive pinion, a final ring gear, universal joints and a dash panel, respectively.

FIG. 6 shows in top view the power unit illustrated in FIGS. 3 and 4, and the relative arrangement between the power unit and a brake master cylinder 244 with a booster 245 of a rightside steering system, together with the position of a brake master cylinder 244' with a booster 245' of a leftside steering system. This Figure is drawn in the same scale as FIG. 5. As clearly shown in FIG. 6, the distance between the brake master cylinders 244 and 244' is increased as compared with that shown in FIG. 5.

With the structure shown in FIGS. 3, 4 and 6, the distance D" between the rear end of the engine and the dash panel 246 becomes larger since the transmission is located behind the clutch (see FIG. 3.). As a consequence, the overall length of the engine compartment becomes larger. Since the engine is slanted as mentioned above, the overall height of the engine compartment may be reduced. However, the distance between the brake master cylinders 244 and 244' becomes larger as shown in FIG. 6 since the exhaust manifold 229 is mounted on one side of the engine block 227, and the intake manifold 228, the carburetor 230 and the air cleaner 231 are mounted on the other side thereof. As a result, the overall width of the engine compartment becomes larger.

Figure 7:
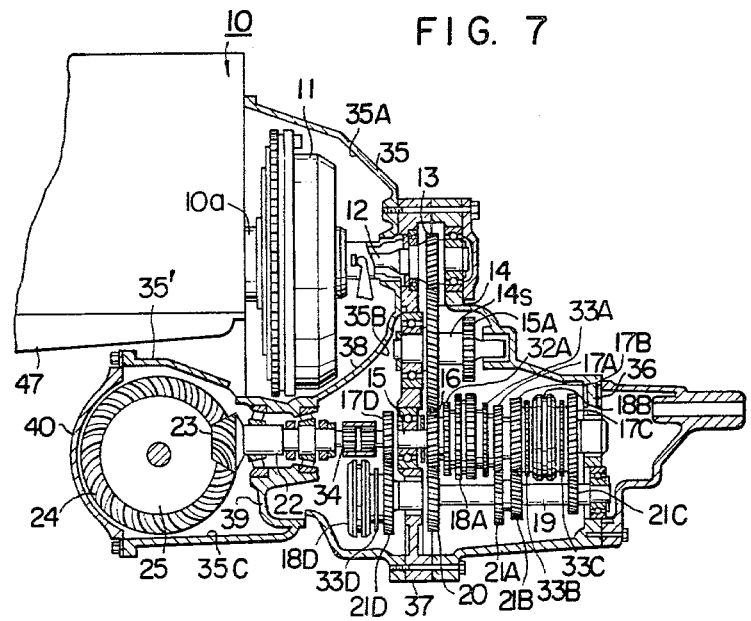
FIG. 7 is a longitudinal sectional view illustrating a first embodiment of an automotive power unit according to the invention.

Next, referring to FIG. 7, an automotive power unit of a first embodiment according to the invention includes a clutch 11 which is mounted on the rear side of an engine 10 and has an output shaft or a clutch shaft 12 disconnectably coupled with an output shaft 10a of the engine 10. An idler shaft 14s extends below and in parallel with the clutch shaft 12 and carries an idler gear 14 which is formed integral with the idler shaft 14s and is in constant mesh with a driving gear 13 formed integral with the clutch shaft 12. A transmission output shaft 15 extends below and in parallel with the idler shaft 14s and the clutch shaft 12, and a power input gear 16 which is rotatably carried by the transmission output shaft 15 is in mesh with the idler gear 14. Driven gears 17A, 17B and 17C which constitute a third-speed gear, a second-speed gear and a first-speed gear, respectively, are rotatably mounted on the output shaft 15 backwardly (or rightwards as viewed in FIG. 7) form the input gear 16 which is located near to the rear end of the clutch 11. The output shaft 15 has a further driven gear 17D which constitutes a fifth-speed gear or an overdrive gear and is formed integral with the output shaft 15. The fifth-speed gear is located forwardly of the input gear 16.

Synchronizing clutches 18A and 18B each constituting an inertia locking type synchro-mesh mechanism are mounted on and splined to the output shaft 15 between the input gear 16 and the third-speed gear 17A and between the second-speed gear 17B and the first-speed gear 17C, respectively. The synchronizing clutch 18A is adapted to be shifted on the output shaft 15 for the selective engagement with splined or toothed hubs 32A and 33A formed integral with the input gear 16 and the first-speed gear 17A, respectively, while the synchronizing clutch 18B is shifted on the output shaft 15 for the selective engagement with splined or toothed hubs 33B and 33C formed integral with the second-speed gear 17B and the first-speed gear 17C, respectively. Thus, when the synchronizing clutch 18A or 18B is shifted by a synchronizing ring (not shown) and a shifting key (not shown) to engage with the splined or toothed hub of the selected gear 16, 17A, 17B or 17C, the synchronizing clutch 18A or 18B and the output shaft 15 may rotate in unison with the selected gear.

A countershaft 19 extends in parallel with the output shaft 15. In FIG. 7, the countershaft 19 is shown below the output shaft 15 for convenience of illustration. Actually, the countershaft 19 extends at one lateral side of the output shaft 15 remote from the ring gear 24 at a position having substantially same height from the ground as the output shaft 15, as will be understood from FIG. 8. A countershaft drive gear 20 which is formed integral with the countershaft 19 is in mesh with the input gear 16 rotatably carried on the input shaft 15. A countershaft third speed gear 21A, a countershaft second-speed gear 21B and a countershaft first-speed gear 21C are formed integral with the countershaft 19 and are in constant mesh with the first-speed gear 17A, the second speed-gear 17B and the first-speed gear 17C, respectively, on the output shaft 15. A countershaft fifth-speed gear (overdrive gear) 21D rotatably mounted on the countershaft 19 is in mesh with the fifth-speed gear 17D formed integral with the output shaft 15. The fifth-speed gear 21D has a synchronizing cone and a splined or toothed hub 33D formed integral therewith. A fifth-speed synchronizing clutch 18D is slidably splined to the countershaft 19, and is engageable with the hub 33D so that the powder may be transmitted from the countershaft 19 to the output shaft 15 through the gears 21D and 17D.

The forward end of the output shaft 15 is drivingly coupled through a spline coupling 34 to a drive pinion shaft 22 which extends coaxially with the output shaft 15 below the clutch 11. A final drive pinion 23 formed integral with the drive pinion shaft 22 at the forward end thereof is in mesh with a final ring gear 24 which in turn is in mesh with a differential gear unit 25, whereby the power from the engine 10 may be transmitted through the differential gear unit 25 to front wheels (not shown). The drive pinion 23 and the ring gear 24 constitute a final gear kit, and both the final gear kit and the differential gear unit 25 are located below the engine 10.

The power unit except the engine 10 is enclosed by a case including a trans-axle case portion 35, a transmission case portion 36 and an intermediate plate 37 interposed or clamped between the trans-axle case portion 35 and the transmission case portion 36. The trans-axle case portion 35 is of a unitary construction and defines a chamber 35A for receiving therein the clutch 11, a chamber 35B for receiving therein the fifth-speed gear train and a chamber 35C for receiving therein the drive pinion 23, the ring gear 24 and the differential gear unit 25. The front flange of the first chamber 35A is bolted to the rear end of the engine 10 and the rear end flange thereof is attached to the intermediate plate 37. The second chamber 35B is defined below the first chamber 35A and is separated therefrom by a partition wall 38. The rear end flange of the second chamber 35B is attached to the intermediate plate 37. The third chamber 35C is defined forwardly of the second chamber 35B, separated therefrom by a partition wall 39 and is located below and spaced apart from the engine 10 by a small distance. The open front end of the third chamber 35C is closed with a cover 40. It will be understood that the part 35' of the trans-axle case portion 35 which encloses the final gear kit and the differential gear unit 25 is formed separately from an oil pan 47.

The transmission case portion 36 is bolted through the intermediate plate 37 to the trans-axle case portion 35 and encloses therein the clutch output shaft 12, the idler shaft 14s, the output shaft 15 and the countershaft 19 together with the gears carried by these shafts. The transmission case 36 also serves to rotatably support the rear ends of these shafts.

When the transmission is in neutral position, the power is transmitted from the clutch shaft 12 to the countershaft 19 through the driving gear 13, the idler gear 14, the input gear 16 and the countershaft drive gear 20, whereby the gears 21A, 21B and 21C and the gears 17A, 17B and 17C are rotated. In the neutral position, however, the pair of fifth-speed gears 21D and 17D are not driven. Since the shift to the first, second, third, fourth, fifth or reverse gear is substantially similar to the conventional transmissions and is well known to those skilled in the art, no further description of the mode of operation of the transmission will be made.

As described above, the third chamber 35C in the trans-axle case portion 35 which encloses the drive pinion 23, the ring gear 24 and the differential gear unit 25 is located below and spaced apart by a small distance from the engine 10, and only the drive pinion shaft 22 which has a relatively small diameter is located below the clutch 11. As a result, the overall height of the power unit from the top of the engine to the bottom of the transmission assembly may be significantly reduced as compared with the conventional power units. Further, with the illustrated structure in which major part of the transmission gear train is disposed backwardly (rightwards as viewed in FIG. 7) of the input gear 16, the members of the power unit except for the transmission gear train do not largely extend in the backward direction. This structure contributes to the reduction of the distance D (FIG. 10) between the rear end of the engine 10 and a dash panel 46 upon which is mounted a booster of a brake master cylinder and hence the distance between the front end of the engine 10 and the dash panel. Thus, the length of the engine compartment may be reduced.

Figure 8:
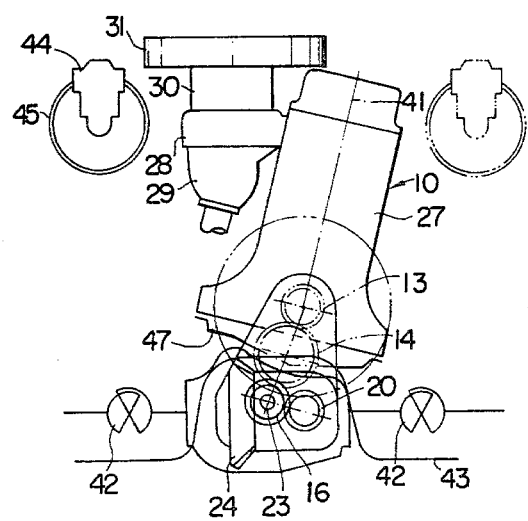
FIG. 8 is a front view of FIG. 7.

FIG. 8 is a front view of FIG. 7. It will be understood from FIG. 8 that the drive pinion 23 is located substantially at the center of the vehicle as viewed in a transverse direction of the vehicle. The engine 10 or a plane 41 containing central axes of cylinders in the cylinder block 27 is slanted at an angle with respect to a vertical plane in the direction away from the ring gear 24, and the intake manifold 28 and the exhaust manifold 29 are located on one lateral side of the slanted engine 10 near to the ring gear 24. In other words, the intake and exhaust manifolds 28 and 29 are located on that side of the slanted engine near to the ring gear 24. Reference numerals 42 and 43 designate universal joints (which may be of a constant velocity type) and a floor of the vehicle, respectively.

Figure 9:
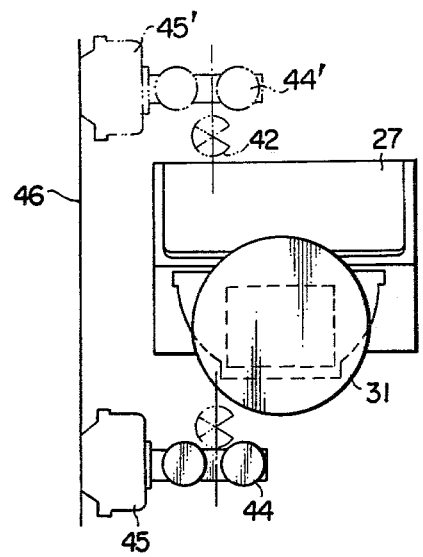
FIG. 9 shows in top view the power unit of the first embodiment together with btake master cylinders of rightside and leftside steering systems.
Figure 10:
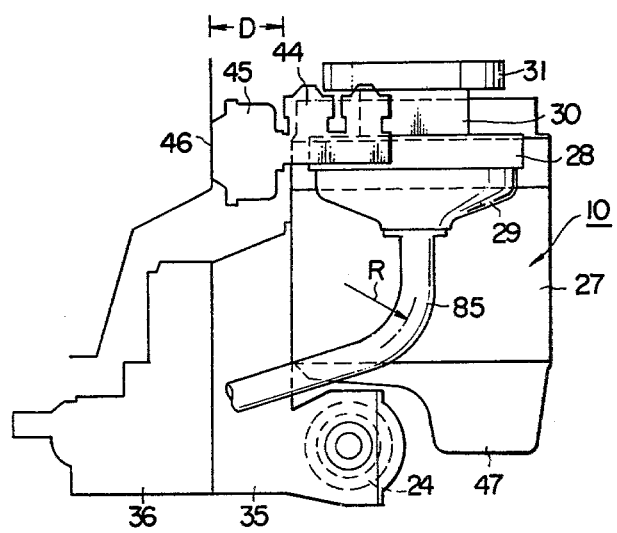
FIG. 10 is a side view of FIG. 9.

FIG. 9 shows in top view the power unit illustrated in FIGS. 7 and 8, together with brake master cylinders 44 and 44' and boosters 45 and 45' for the rightside and leftside steering systems, and FIG. 10 is a side view of FIG. 9. It is to be noted that FIGS. 9 and 10 are drawn in substantially same scale as FIGS. 5 and 6 explained hereinbefore. It can be seen from these Figures that, with the structure of the invention, the brake master cylinders 44 and 44' and the boosters 45 and 45' may be located closer to the engine so as to advantageously reduce the overall width of the engine compartment and hence the overall width of the vehicle. It is of course necessary to take an appropriate clearance between the engine 10 and the brake master cylinder 44 or 44' with the booster 45 or 45', so as to prevent that the brake master cylinder and the booster are exposed to a high temperature caused by exhaust gases flowing through the exhaust manifold 29.

The illustrated power unit is of the type in which the final ring gear is disposed below the engine at a location spaced backwardly from the center of the latter. When this type of the power unit is used, the driving or front wheels are positioned almost coaxial with the ring gear. In order to increase an available utility space in the driver's and passenger's compartment of the automotive vehicle, the brake, clutch and accelerator pedals should be disposed as forwardly as possible. However, in the case where the power unit of the above-mentioned type is used for a compact automotive vehicle having a small width, the pedals cannot be disposed in a limited space defined at a front-most position of the driver's and passenger's compartment between a lateral tyre house and a central floor tunnel. Thus, the brake, clutch and accelerator pedals of the rightside steering vehicle are ordinarily disposed such that the accelerator pedal is spaced backwardly by a suitable distance from the adjacent tyre house or the wheel. Similarly, the corresponding pedals of the leftside steering vehicle are disposed such that the clutch pedal is spaced backwardly by a suitable distance from the adjacent tyre house or the wheel. With the structure of the invention in which the drive pinion 23, the ring gear 24 and the differential gear unit 25 are disposed below the engine, the transmission gear train is not disposed below the clutch and the brake master cylinders with the booster may be arranged preferably relative to the engine, the distance between the pedals and the adjacent wheel may be reduced. Also the height and width of the floor tunnel may be reduced within a range that this reduction does not badly affect the press work of the floor member. Further, since the brake, clutch and accelerator pedals may be disposed at a forward position approaching the clutch because of the structure that the major part of the transmission gear train is disposed rearward of the input gear 16 as discussed above, the available utility space in the driver's and passenger's compartment may be significantly increased.

As can be seen from FIG. 10, when the engine is of a counterflow type, the exhaust manifold 29 is located at a relatively high position. With this structure, even when the radius R of an exhaust pipe 85 is increased to facilitate the forming or manufacture of the latter, the universal joint 42 which is coaxial with the ring gear 24 may be sufficiently spaced apart from the exhaust pipe 85 so that the universal joint 42 may not be adversely affected by the high temperature exhaust gases flowing through the exhaust pipe 85. Therefore the distance from the axis of the ring gear 24 or the center of the wheel to the top of the engine 10 may be reduced so that the position of the hood may be lowered. As a consequence, the visibility of the vehicle may be considerably improved and the seat and the center of gravity of the engine 10 may be lowered.

Figure 11:
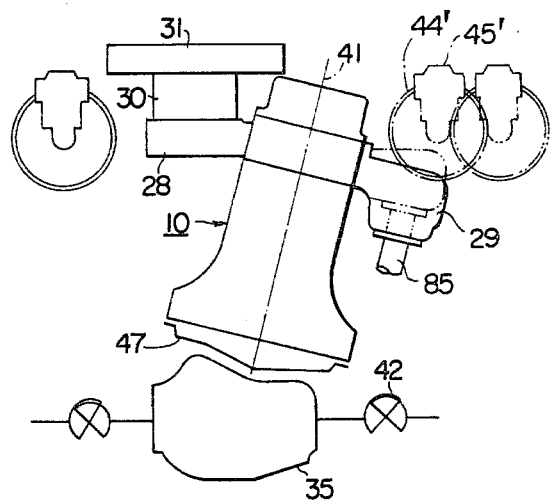
FIG. 11 is a similar view to FIG. 8 illustrating an automotive power unit including an engine of crossflow type.

However, in case of the crossflow, intake-exhaust type engine as shown in FIG. 11, the overall width of the vehicle cannot be so reduced as the present invention for the reasons given below. In case of the leftside steering system, the brake master cylinder 44' is adversely affected by the high temperature exhaust gases flowing through the exhaust manifold 29. The problem can be overcome if a heat shielding plate or the like is interposed between the exhaust manifold 29 and the brake master cylinder 44'. In practice, however, there is no space available for placing the heat shielding plate. In order to avoid the adverse thermal mal-infuences, therefore, the brake master cylinder 44' must be displaced to the right as indicated by the two-dot chain lines in FIG. 11. Furthermore, in the case where the radius R of the exhaust pipe 85 is increased to facilitate the production of the exhaust pipe as described above with reference to FIG. 10 the exhaust manifold 29 must be located at a higher position as indicated by the two-dot chain line in FIG. 11, so as to ensure a sufficient distance between the universal joint 42 and the exhaust pipe 85. As a result, the brake master cylinder 44 must be further spaced apart to the right in FIG. 11 from the exhaust manifold 29. Thus in case of the cross-flow, intake-exhaust type engine, the reduction in overall width of the vehicle is difficult.

Figure 12:
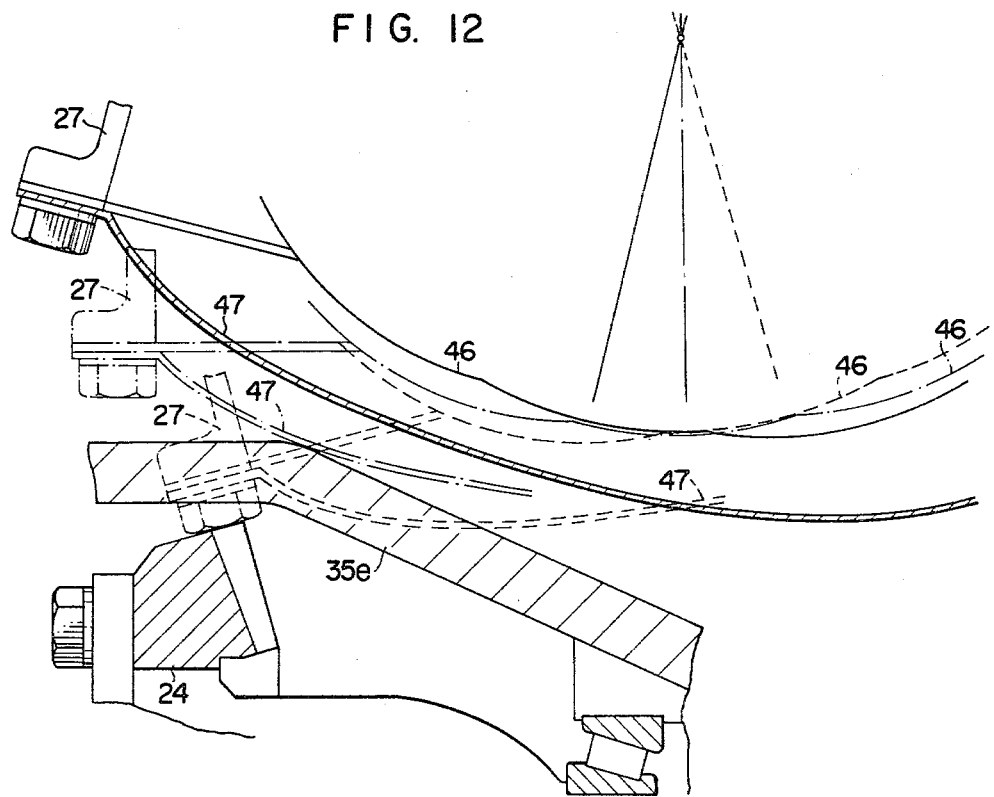
FIG. 12 is an explanative view showing the positional relationship between an oil pan and a differential gear case.

Next, referring to FIG. 12, the advantage of slanting the engine 10 as discussed above with reference to FIG. 8 will be further described. FIG. 12 is a view seen from the front of the vehicle and shows the loci 46 of the lower end of a piston connecting rod, and the positions with respect to the differential gear housing 35e of the oil pan 47 of the engine 10 which must be spaced apart form the loci 46 of the lower end of the connecting rod by a predetermined distance. The solid lines show the locus 46 and the position of the oil pan 47 when the engine 10 is slanted at an angle relative to the vertical away from the ring gear 24 as described above with reference to FIG. 8, the center of slant of the engine 10 being the axis of the drive pinion shaft 22. The one-dot chain lines show the locus 46 and the oil pan 47 when the engine is not slanted; that is, the engine is vertical. The dotted lines shown the locus 46 and the oil pan 47 when the engine 10 is slanted in the direction opposite to the direction indicated in FIG. 8; that is, when the engine 10 is slanted at an angle with respect to the vertical toward the ring gear 24.

It can be seen that in case of the present invention; that is when the engine 10 is slanted to the right, the oil pan 47 is spaced apart from the differential gear housing 35e by a sufficient distance. In case of the vertical engine, there is almost no space between the oil pan 47 and the housing 35e as indicated by the one-dot chain lines. When the engine is slanted to the left or in the direction opposite to the direction indicated in FIG. 8, the oil pan 47 interferes with the housing 35e as indicated by the broken lines. As a result, the slant of the engine to the left cannot be employed. Thus, it will be understood that the most advantageous arrangement of the engine 10 is to slant it to the right as best shown in FIG. 8. With this slant, the distance between the top of the engine 10 and the axis of the ring gear 24 and hence the height of the power unit as well as the engine compartment may be significantly reduced.

Figure 13:
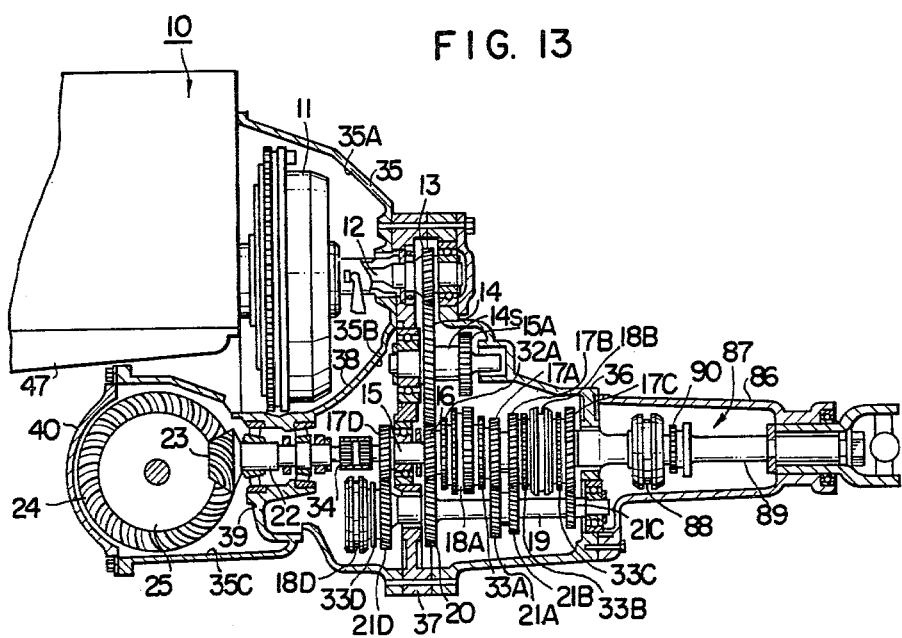
FIG. 13 is a longitudinal sectional view illustrating an automotive power unit according to a second embodiment of the invention.

In the second embodiment shown in FIG. 13, the present invention is applied to a four-wheel drive automotive vehicle. A four-wheel drive declutching or change-over device 87 which is enclosed in an extension housing 86 bolted to the rear end of the transmission case portion 36 includes a clutch sleeve 88 splined to the output shaft 15 for engagement with a clutch or dog teeth 90 formed integral with a connecting shaft 89 drivingly coupled to a propeller shaft (not shown). When the clutch sleeve 88 is shifted to engage with the clutch or dog teeth 90, the output shaft 15 is coupled to the connecting shaft 89 so that not only the front wheels but also the rear wheels may be driven. The other structure of the second embodiment is substantially similar to the first embodiment described. It will be understood that the second embodiment brings about substantially same meritorious effects as those obtained with the first embodiment.

So far the present invention has been described in conjunction with the manually operated transmission, but the present invention may be applied to a power unit including an automatic transmission assembly as will be described below with reference to FIGS. 14 and 15.

Figure 14:
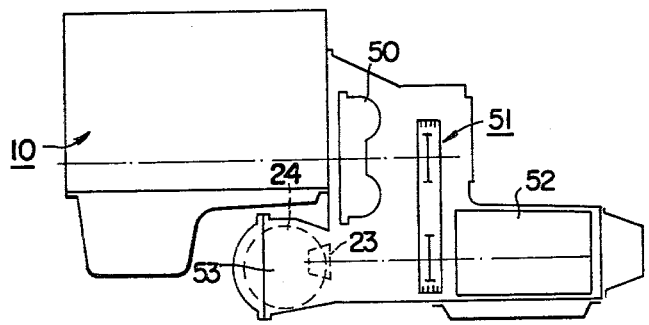
FIG. 14 is a schematic side view showing an automotive power unit according to a third embodiment of the invention.
Figure 15:
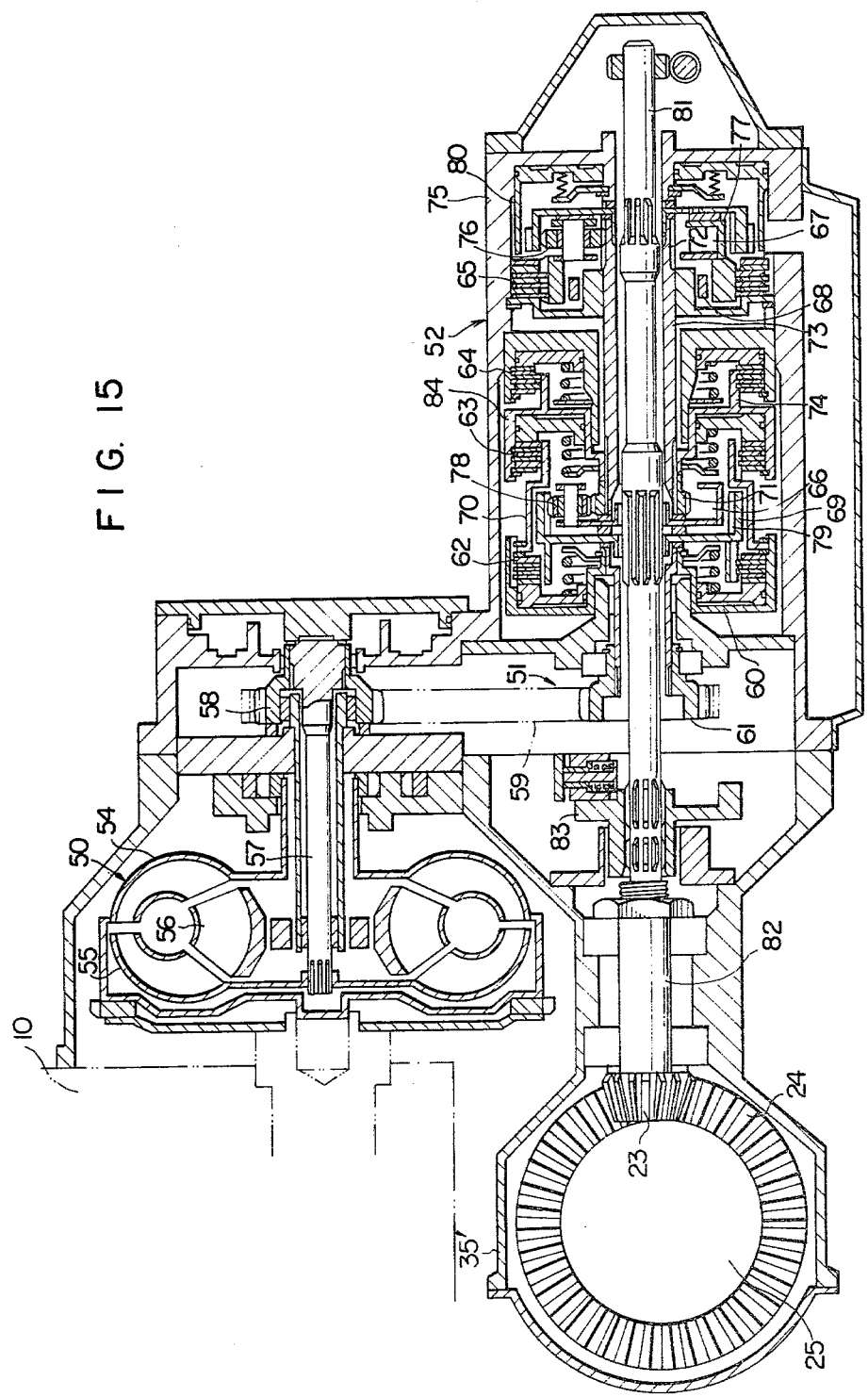
FIG. 15 is a longitudinal sectional view illustrating the power unit of FIG. 14 in an enlarged scale.

Referring to FIGS. 14 and 15, an automotive power unit of a third embodiment according to the invention is illustrated. This third embodiment is substantially similar in construction to the first embodiment except that, in the third embodiment, a torque converter 50 and a planetary gear unit 52 are used instead of the clutch and the transmission assembly of the first embodiment. As in the first embodiment, a final gear kit including a final drive pinion 23 and a final ring gear 24, and a differential gear unit 53 are located below the engine 10. The torque converter 50 and the planetary gear unit 52 are operatively connected through a transfer assembly 51. The torque converter 50 includes a pump 54, a turbine 55 and a stator 56. The power from the engine 10 is transmitted through the pump 54 and the turbine 55 to an output shaft 57 connected to the turbine 55. The power transfer assembly 51 includes a driving sprocket wheel 58 mounted on the output shaft 57 and drivingly coupled through a chain 59 to a driven sprocket wheel 61 of the planetary gear unit 52.

The planetary gear unit 52 comprises a front clutch 62, a rear clutch 63, a front brake 64, a rear brake 65, a front planetary gear set 66, a rear planetary gear set 67 and a one-way clutch 68. The front clutch 62 is located between a ring gear 69 of the front planetary gear set 66 and an input member 60. The rear clutch 63 is located between a hub 70 connected to the front clutch 62 and member 84 connected to a sun gear shaft 73 which couples a sun gear 71 of the front planetary gear set 66 with a sun gear 72 of the rear planetary gear set 67. The front brake 64 is located between a hub 74 connected to the rear clutch 63 and a transmission case 75. A planet carrier 77 carrying planet gears 76 of the rear planetary gear set 67 is coupled through the one-way clutch 68 and the rear brake 65 to the case 75. A planet carrier 79 carrying planet gears 78 of the front planetary gear set 66 and a ring gear 80 of the rear planetary gear set 67 are drivingly coupled to an output shaft 81 which is coaxial with the input member 60. The output shaft 81 is splined through a governor 83 to a drive pinion shaft 82.

The torque-converter transmission is controlled by the front and rear clutches 62 and 63, the front and rear brakes 64 and 65 and the one-way clutch 68. The power of the engine 10 is transmitted through the pump 54 and the turbine 55 of the torque converter 50, the output shaft 57 connected to the turbine 55, the driving sprocket wheel 58 on the output shaft 57 and the chain 59 to the driven sprocket wheel 61.

In a first-speed drive, the front clutch 62 is operatively coupled to the one-way clutch 68 so that the power is transmitted at a reduced speed from the input member 60 to the output shaft 81 through the planet carrier 79 of the front planetary gear set 66, the sun gears 71 and 72 of the front and rear planetary gear sets 66 and 67 and the ring gear 80 of the rear planetary gear set 67.

In a second-speed drive, the front brake 64 holds the sun gear shaft 73 stationary so that the power is transmitted at a reduced speed from the front clutch 62 through the planet carrier 79 to the output shaft 81.

In a third-speed drive, both the front and rear clutches 62 and 63 are in the coupling state so that the front planetary gear set 66 is locked and consequently the output shaft 81 is caused to be rotated in unison with the input member 60.

In a reverse drive, the rear clutch 63 is in the coupling state and the rear brake 65 is applied, so that the power is transmitted at a reduced speed and in the reversed direction to the output shaft 81 through the sun gear 72 of the rear plantary gear set 67.

The power thus transmitted to the output shaft 81 is transmitted to the drive pinion shaft 82 through the governor 83.

In the illustrated embodiment, the power is transmitted from the output shaft 57 of the torque converter 50 to the input member 60 through the driving sprocket wheel 58, the chain 59 and the driven sprocket wheel 61, however, it is to be understood that the output shaft 57 of the torque converter 50 may carry a driving gear which engages through idler gears with an input gear carried on the input member 60. Furthermore instead of the planetary gear unit, a conventional two-parallel-shaft type transmission having a countershaft may be employed.

According to the third embodiment of the present invention, the final gear kit and the differential gear unit 25 are located below the engine 10 and the drive pinion shaft 82 which is coaxially connected to the output shaft 81 is located below the torque converter 50 of relatively large diameter, so that the overall height of the power unit and hence of the engine compartment may be advantageously reduced. Further, since the planetary gear unit 52 is located backwardly (or rightwards as viewed in FIG. 15) of the transfer assembly 51 which is located near to the rear end of the torque converter, substantially same advantages as those of the first embodiment may be obtained. It will be understood that the engine 10 of the third embodiment is slanted in the same manner as the first embodiment although this point is not illustrated in FIGS. 14 and 15, and that a case portion 35' for enclosing the final gear kit and the differential gear unit 25 are formed separately from the engine oil pan. Also it will be understood that the power unit of the third embodiment may be modified for use with a four-wheel drive automotive vehicle in the same manner as the second embodiment.

What is claimed is:

1. In a power unit for use with an automotive vehicle comprising a counterflow, intake-exhaust type engine with straight-lined cylinders having an intake and an exhaust manifolds, said engine having pistons and piston connecting rods each having a lower end, said engine being adapted to be mounted on a front side of said vehicle with a crank shaft of said engine extending in a longitudinal direction of said vehicle, clutch means having an output shaft substantially coaxial with the crank shaft of said engine and carrying thereon a driving gear, a transmission assembly having an output shaft extending below and substantially parallel to said output shaft of said clutch means, said output shaft of said transmission assembly being connected to a drive pinion shaft which is disposed approximately at the center of the width of said vehicle, a final gear kit disposed below said engine and including a final drive pinion connected to said drive pinion shaft and a final ring gear, and a differential gear unit disposed below said engine, the improvement wherein said engine is slanted with respect to a vertical plane toward one lateral side of said vehicle so as to make the locus of points defined by the movement of the lower end of the connecting rod remote from said final ring gear, and said intake and exhaust manifolds are disposed on one lateral side of said engine near to said final ring gear.

2. A power unit as set forth in claim 1, wherein said drive pinion shaft is disposed below said clutch means.

3. A power unit as set forth in claim 1 or 2, wherein a case portion for enclosing said final gear kit and said differential gear unit is formed separately from an oil pan of said engine.

4. A power unit as set forth in claim 1 or 2, wherein said transmission assembly includes a power input gear carried on said output shaft of said transmission assembly and operatively associated with said driving gear of said clutch means, said power input gear being located near to the rear end of said clutch means, and a plurality of driven gears carried on said output shaft of said transmission assembly and located rearward of said power input gear.

5. A power unit as set forth in claim 1 or 2, wherein said transmission assembly includes a power input gear carried on said output shaft of said transmission assembly and operatively associated with said driving gear of said clutch means, said power input gear being located near to the rear end of said clutch means, a plurality of driven gears carried on said output shaft of said transmission assembly and located rearward of said power input gear, and a countershaft disposed substantially parallel to and in side-by-side relationship with said transmission output shaft and carrying thereon countershaft gears which are in mesh with said driven gears carried on said transmission output shaft, said countershaft being disposed at that side of said transmission output shaft remote from said final ring gear.

6. A power unit as set forth in claim 1 or 2, wherein said clutch means and said transmission assembly are composed of a torque converter and a planetary gear unit.

7. A power unit as set forth in claim 1 or 2, further comprising means for connecting the rear end of said transmission output shaft with a propeller shaft for four-wheel drive.

* * * * *